(12) United States Patent
Yano

(10) Patent No.: US 7,024,123 B2
(45) Date of Patent: Apr. 4, 2006

(54) OPTICAL DATA TRANSMITTING APPARATUS AND METHOD

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 66 days.

(21) Appl. No.: 11/010,425

(22) Filed: Dec. 14, 2004

(65) Prior Publication Data

US 2005/0100347 A1  May 12, 2005

Related U.S. Application Data

(62) Division of application No. 10/103,863, filed on Mar. 25, 2002, now Pat. No. 6,915,082, which is a division of application No. 09/085,882, filed on May 27, 1998, now Pat. No. 6,421,155.

(30) Foreign Application Priority Data

May 28, 1997   (JP)   .................................. 9-138985

(51) Int. Cl.
*H04B 10/04* (2006.01)
(52) U.S. Cl. ........................ 398/184; 398/185; 398/188
(58) Field of Classification Search ................ 398/182, 398/183, 184, 185, 188

See application file for complete search history.

(56) References Cited

U.S. PATENT DOCUMENTS

| 5,526,162 A * | 6/1996 | Bergano .................... 398/185 |
| 5,920,416 A * | 7/1999 | Beylat et al. ............... 398/185 |
| 6,556,326 B1 * | 4/2003 | Bergano .................... 398/183 |

\* cited by examiner

*Primary Examiner*—Jason Chan
*Assistant Examiner*—Christina Y Leung
(74) *Attorney, Agent, or Firm*—Dickstein, Shapiro, Morin & Oshinsky, LLP.

(57) ABSTRACT

An optical data transmitting apparatus and method allows data transmission over a distance that surpasses a limit, which has been imposed due to group velocity dispersion (GVD) and self phase modulation (SPM) effect within optical fiber. This has been accomplished by allocating trinal duobinary symbols to optical 1, P, −1 symbols. These optical symbols have the same intensity, +1 and −1 symbols have inverted optical phases each other, and orthogonally polarized each other between ±1 and P symbols. At the receiver, conventional polarization shift keying receiver can be used to restore original binary data stream.

7 Claims, 9 Drawing Sheets

FIG. 3

| INPUT ELECTRIC SIGNAL | +1 | 0 | −1 |
|---|---|---|---|
| OUTPUT LIGHT (50) | ↑ | ↔ | ↓ |
|  | +1 | 0 | −1 |
| OUTPUT LIGHT (51) | ↔ | ↑ | ↔ |
|  | 0 | 1 | 0 |

(1, 1) CONVERSION

OPTICAL DATA TRANSMITTING APPARATUS AND METHOD

CROSS REFERENCE TO RELATED APPLICATIONS

This application is a Divisional application of U.S. patent application Ser. No. 10/103,863 filed Mar. 25, 2002 now U.S. Pat. No. 6,915,082, which is a Divisional application of U.S. Pat. application Ser. No. 09/085,882 filed May 27, 1998, now U.S. Pat. No. 6,421,155, which claims priority to Japanese Patent Application No. 09-138985, filed May 28, 1997. The contents of all of these applications are hereby incorporated by reference herein.

BACKGROUND OF THE INVENTION

Field of the Invention

The present invention relates to an optical data transmitting apparatus and a method for an optical data transmission system using optical fiber.

Recently, in optical fiber data transmission, intensity modulation direct detection systems have been widely used and wavelength-multiplexing technology has been employed for increased data transmission capacity. In this type of system, a combination of group velocity dispersion (GVD) and self phase modulation (SPM) occurring in an optical fiber causes waveform distortion, resulting in degraded data transmission quality.

GVD is a phenomenon in which propagation speed through optical fiber varies with wavelength. Modulated signals suffer from waveform distortion because of its wide signal spectrum. Recent technology provides a compensation element for waveform distortion due to GVD. Such a compensation element, however, is expensive. Thus, there have been proposals for modulated signals which are less affected by GVD. The narrower the signal spectrum, the less the signal is affected by GVD. Thus, improvement may be expected if the signal spectrum is narrowed. Optical duobinary modulation is one approach. JP-A 8-139681, which is deemed to be the Japanese equivalent of U.S. Pat. No. 5,543,952 (Yonenaga et al.), and K. Fukuchi et al. OFC '97 Technical Digest, ThH3, 1997 teach optical data transmission utilizing such optical duobinary modulation. Duobinary signals fall within a category of partial response signals. Three-level duobinary signals are known, and have three levels of amplitude. According to the optical duobinary modulation, three levels are allocated to three states "+1", "0", "−1" using phase and amplitude of light. The state "0" indicates that the intensity level is zero. The state "+1" and "−1" indicate that the intensity level is one, but the phases are inverted from each other. At the receiver, this optical duobinary modulated signal is decoded into the original two-level digital signal by normal direct detection. During propagation through optical fiber, the signal band is left in a compressed state and waveform distortion due to GVD is low.

SPM is another cause of degradation of data transmission quality. SPM is a phenomenon in which phase modulation is applied to a signal as its light intensity varies with time. This problem is unavoidable if intensity modulation is employed. The above-mentioned optical duobinary signal is the same as the ordinary intensity modulated signal in that it uses light intensity. Thus, suppression of SPM cannot be expected. SPM increases signal spectrum bandwidth although it does not alter the signal waveform, thereby limiting the density of wavelength multiplexing. SPM cooperates with GVD to induce a combined SPM+GVD effect.

As one approach to reduce SPM, polarization modulation has been proposed. In polarization modulation, light signals are allocated to different polarization states of light. As the overall intensity is unaltered, the effect of SPM is less, thus suppressing degradation of data transmission quality. JP-A 1-208920 (Fukaya) discloses an optical fiber data transmission employing such polarization modulation.

The SPM+GVD effect in question is a phenomenon in which during propagation through an optical fiber, SPM occurs concurrently with the occurrence of waveform distortion, and thus the dispersion compensation technique cannot restore the waveform. If SPM occurs concurrently with waveform distortion, the light signal is subjected to frequency chirping. The presence of GVD causes the chirping to induce further waveform distortion. This further waveform distortion induces new SPM. Thus, the waveform distortion is different from distortion in the absence of SPM, and this is the reason why the dispersion compensation technique is ineffective to restore the waveform distortion under the presence of SPM. The effect of GVD+SPM is thus considered to be the major obstacle to the extension of data transmission distances in optical fiber data transmission to any distance exceeding 1000 kilometers.

From preceding description, it is to be understood that the conventional duobinary signal is ineffective against SPM, and polarization modulation is ineffective to prevent GVD, although the former is effective against GVD and the latter is effective against SPM.

SUMMARY OF THE INVENTION

The present invention aims to provide a signal combining the merits of the conventional duobinary signal and polarization modulation.

According to one aspect of the present invention, there is provided an optical data transmitting apparatus comprising:

a code encoder transforming a binary input data signal to obtain a duobinary signal having a center level and two extreme levels;

a carrier source of a carrier light;

an optical modulator modulating phase and polarization of said carrier light in response to said duobinary signal to obtain a modulated output light, said modulated output light having first polarization state that corresponds to said center level of said duobinary signal, and second and third polarization states that correspond to said two extreme levels, respectively, said second and third polarization states sharing a common plane of polarization that is orthogonal to a plane of polarization of said first polarization state, said second and third polarization states having phases that are inverted to each other.

According to another aspect of the present invention, there is provided an optical data transmitting apparatus comprising:

a code converter transforming a binary input data signal to obtain a pair of mutually complementary duobinary signals;

a carrier source of a carrier light;

an intensity modulator separating said carrier light into first and second carrier lights, altering phases of said first and second altered carrier lights in response to said pair of mutually complementary duobinary signals, respectively, combining said phase altered first and second carrier lights to obtain a pair of mutually complementary interference output light; and means for combining said pair of mutually complementary interference output light beams in mutually orthogonal polarized relation.

According to still another aspect of the present invention, there is provided an optical data transmission apparatus comprising:

means for separating a binary input signal into a first altered data signal and a second altered data signal;

a polarization modulator modulating polarization of said carrier light in response to said first altered data signal to obtain polarized carrier light;

a pre-coder transforming code of said second altered data signal to obtain a coded second altered data signal; and a phase modulator modulating the phase of said polarized carrier light in response to said coded second altered data signal.

According to a further aspect of the present invention, there is provided an optical data transmitting apparatus comprising:

a carrier source for a carrier light;

means for separating a binary input data signal into a first data signal and a second data signal;

a polarization modulator modulating polarization of said carrier light in response to said first data signal to obtain polarization modulated carrier light;

a pre-coder transforming code of said second data signal to obtain a coded second data signal; and a phase modulator modulating the phase of said polarization modulated carrier light in response to said coded second data signal.

According to a still further aspect of the present invention, there is provided an optical transmitting apparatus comprising:

a carrier source of carrier light;

means for separating said carrier light into first and second orthogonally polarized lights, phase modulating said first polarized light in response to a first driving signal to obtain a phase modulated first polarized light, phase modulating said second polarized light in response to a second driving signal to obtain a phase modulated second polarized light, and combining said phase modulated first and second polarized lights; and a driving signal generator inputting a binary input data signal to generate said first and second driving signals.

According to a further aspect of the present invention, there is provided an optical transmitting apparatus comprising:

a carrier source of carrier light;

a polarization modulator modulating polarization of said carrier light, said polarization modulator being provided with means for inputting a duobinary signal as a modulator driving signal, said polarization modulator being an optical azimuth rotator and operative to optically rotate the polarization of said carrier light in response to said modulator driving duobinary signal such that said carrier light has an opposite phase in response to said modulator driving signal being at the maximum phase or the minimum phase.

According to yet another aspect of the present invention, there is provided an optical data transmitting method comprising the steps of:

transforming a binary input data signal to obtain a duobinary signal having a center level and two extreme levels; and modulating the phase and the polarization of a carrier light in response to said duobinary signal to obtain a modulated output light, said modulated output light having a first polarization state that corresponds to said center level of said duobinary signal, and second and third polarization states that correspond to said two extreme levels, respectively, said second and third polarization states sharing a common plane of polarization that is orthogonal to a plane of polarization of said first polarization state, said second and third polarization states having phases that are inverted from each other.

According to a further aspect of the present invention, there is provided an optical data transmitting method comprising the steps of:

transforming a binary data signal to obtain a pair of mutually complementary duobinary signals;

separating a carrier light into a first carrier light and a second carrier light;

modulating phases of said first and second carrier lights in response to said pair of mutually complementary duobinary signals, respectively, to obtain phase modulated first and second carrier lights;

combining said phase modulated first and second carrier lights to interfere with each other to obtain a pair of mutually complementary interference output lights; and combining said pair of mutually complementary interference output lights in mutually orthogonal polarized relation.

According to a further aspect of the present invention, there is provided an optical data transmitting method comprising the steps of:

separating a binary input data signal into a first data signal and a second data signal;

inputting said first data signal to obtain a pair of mutually complementary interference output lights;

transforming a code of said second data signal to obtain a coded second data signal' inputting one of said pair of mutually complementary interference output lights and said coded second data signal to modulate the phase of said one interference output light in response to said coded second data signal to obtain a phase modulated interference output light; and combining said phase modulated interference output light and the other of said pair of mutually complementary interference output lights in mutually orthogonal polarized relation.

According to a further aspect of the present invention, there is provided an optical data transmitting method comprising the steps of:

separating a binary input data signal into a first data signal and a second data signal;

modulating the polarization of a carrier light in response to said first data signal to obtain a polarization modulated carrier light;

transforming a code of said second data signal to obtain a code transformed second data signal; and modulating the phase of the polarization modulated carrier light in response to said code transformed second signal.

According to a further aspect of the present invention, there is provided an optical data transmitting method comprising the steps of:

separating a carrier light into first and second orthogonally polarized lights;

phase modulating said first polarized light in response to a first driving signal to obtain a phase modulated first polarized light;

phase modulating said second polarized light in response to a second driving signal to obtain a phase modulated second polarized light;

combining said phase modulated first and second polarized lights; and inputting a binary input data signal to generate said first and second driving signals.

According to a further aspect of the present invention, there is provided an optical data transmitting method comprising the steps of:

transforming a binary input data signal to obtain a duobinary signal as a modulator driving signal; and rotating a polarization of a carrier light, using an optical azimuth rotator, in response to said modulator driving signal such that said carrier light has an opposite phase in response to said modulator driving signal being at the maximum or the minimum.

BRIEF DESCRIPTION OF THE DRAWINGS

FIG. 3 illustrates the states of two interference output lights in the first embodiment.

Table I illustrates a code conversion rule employed by a pre-coder of the first embodiment.

Table II illustrates a code conversion rule employed by a driving signal generator of the fourth embodiment.

Table III illustrates a code conversion rule employed by a driving signal generator of the fourth embodiment.

Table IV illustrates a code conversion rule employed by a driving signal generator of the fourth embodiment.

DETAILED DESCRIPTION OF EMBODIMENTS OF THE INVENTION

Referring to the accompanying drawings, the present invention is described along with several preferred embodiments.

First Embodiment

Figure 1:
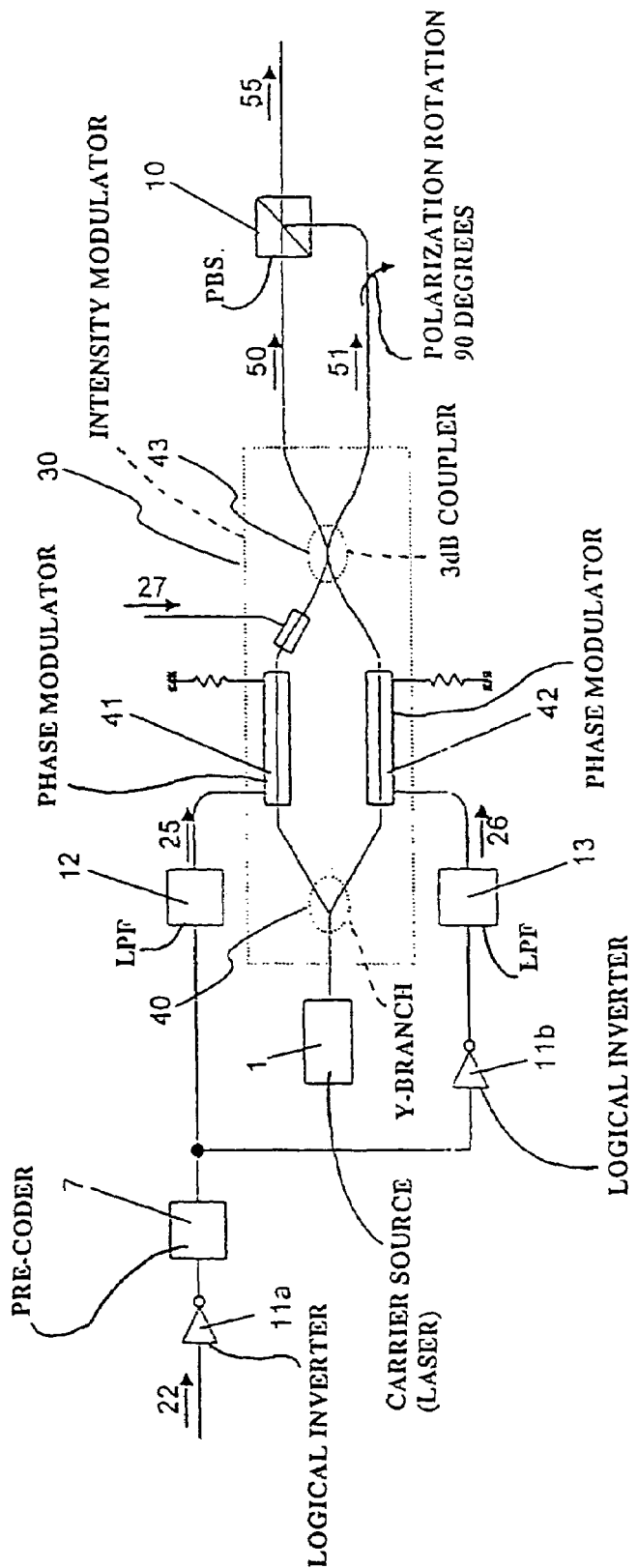
FIG. 1 is a schematic view of a first embodiment of an optical data transmitting apparatus according to the present invention.

FIG. 1 illustrates a first preferred implementation of the present invention, which employs an optical duobinary modulation technique using a push-pull type Mach-Zehnder optical intensity modulator, which has been mentioned in U.S. Pat. No. 5,543,952. The Mach-Zehnder (MZ) intensity modulator is a type of interferometer, thus it has two output ports which are complementary to each other. According to a conventional system, only one output of the interferometer is actually used, while the other output is allowed to diverge. According to this first embodiment, the polarization of the other half output is rotated 90 degrees and superimposed on the one half, thereby providing a modulated light having a complemented intensity.

A device in the form of a semiconductor laser 1 is used as a carrier source of carrier light. The semiconductor laser 1 produces radiation having a 1.55 μm (micrometers) wavelength band. The output of the laser 1 propagates through a polarization maintaining (PM) optical fiber to a LiNbO3 optical intensity modulator 30 of the push-pull drive MZ interferometer type. The PM optical fiber can transmit the light with its linear propagation unaltered. The modulator 30 separates or divides the incident light at a Y-branch 40 so that half the light travels through each optical path to a 3 dB coupler 43. The optical paths include phase modulating sections 41 and 2, respectively, each of which performs phase modulation in response to the corresponding one of duobinary signals 25 and 26. Superimposition at the 3 dB coupler 43 outputs interference lights 50 and 51. All of the above-mentioned components of the modulator 30 are integrated on a single substrate and PM fiber pig-tails are attached to the input and output.

Binary (two-level) input data signal 22 is impressed on an input of a first local inverter (NOT circuit) 11a. A pre-coder or elementary encoder 7 codes the output of the inverter 11a. The precoded signal is divided into two halves with one half being fed to first low pass filter (LPF) 12 to produce a first duobinary signal 25. The other half of the precoded signal is impressed on an input of a second logical inverter 11b. The output of the inverter 11b is fed to a second LPF 13 to produce a second duobinary signal 26.

Figure 4:
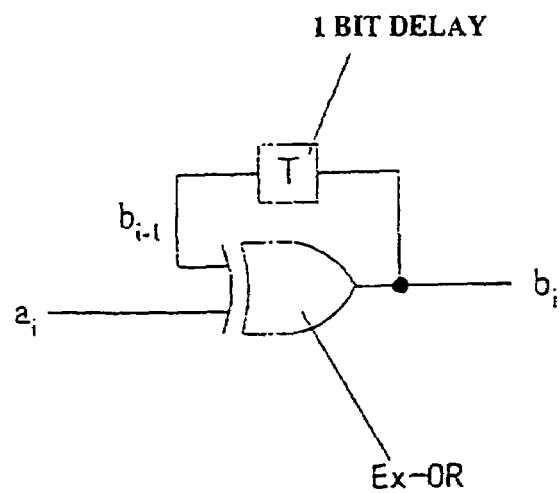
FIG. 4 is a circuit diagram illustrating one example of a pre-coder.

FIG. 4 illustrates a circuit diagram of the pre-coder 7. TABLE I illustrates a truth value table showing the code conversion rule between a logical input $a_i$, a logical output $b_i$, and a feedback $b_{i-1}$. The LPFs 12 and 13 each take the form of a fifth order Bessel-Thompson low-pass filter that has a cutoff frequency roughly as high as one fourth (¼) of a bit rate. The pre-coder 7 and LPF 12 that are used herein are well known as a pre-coder for duobinary processes and a (1, 1) converter, respectively. The perform the conversion as follows:

Input of pre-coder 7; $a_i$

Output of pre-coder 7; $b_i = a_i$ (EX-OR)$b_{i-1}$

EX-OR; Exclusive OR

Output of (1,1) converter: $c_i = b_i + b_{i+1}$

Various forms of implementing this conversion are known although specific description of them is hereby omitted.

The logical inverter 11b and LPF 13 path creates the second duobinary signal 26. This duobinary signal 26 is the same as the duobinary signal 25, but has an inverted polarity to the latter. This process of producing the second duobinary signal 26 is superior to the process of producing the signal 26 by simply inverting the polarity of the first duobinary signal 25. This is because the signal 25 is analog, and inverting it might cause deterioration of the waveform. If desired, an inverter may be provided for the final output of a receiver side.

In the modulator 30 of the push-pull type, the halves of the light traveling along one and the other optical paths of the MZ interferometer are phase adjusted in opposite directions. The operation of the invention will now be further described with reference to FIG. 3. FIG. 3 illustrates two interference output lights 50 and 51, each having three different states that correspond to three amplitude levels, namely, +1, 0, and −1, of duobinary code of an input electrical signal, respectively. This input electrical signal does not contain any DC components. The adjustment to align the amplitudes and timings of duobinary signals 25 and 26 and the appropriate setting of a DC bias adjuster 27 result in the phase modulation as illustrated in FIG. 3. In this Figure, a non-bold vector represents light which is aligned out of each optical path of the MZ interferometer, while a bold vector, which results from two non-bold vectors, represents the interference output light. It is now understood that the interference output lights 50 and 51 are complementary to each other such that the absolute value of the vector sum is always 1 (one). For simplicity of illustration, the relative phase difference between the outputs 50 and 51 has been neglected.

Twisting one of the PM fiber pig-tails for the light outputs 50 and 51 through 90 degrees prior to superimposition at a polarization beam splitter (PBS) 10 results in production of a modulated signal beam 55 (output light) that has a complemented constant intensity. This signal beam 55 is not completely duobinary because it includes an intensity-modulated optical component as well as a duobinary optical component. This does not pose any problem, however, because upon receiving the transmitted signal, the intensity-modulated component is not used and only the duobinary optical component is used.

An experiment was conducted with an optical transmission system incorporating the first embodiment. The experimental conditions were as follows:

The bit rate was 5 Gb/s. The optical path included an optical fiber with a GVD level of −1.5 ps/nm/km, optical amplifiers, and dispersion compensating optical fibers (DCF), each being about 20 km in length and having a GVD level of +17 ps/nm/km. The optical amplifiers were spaced apart at a regular distance of 40 km, and the DCF were spaced apart at a regular distance of about 240 km. In this experiment, an optical fiber having a GVD level as low as −1.5 ps/nm/km was used. This selection is attributable to the fact that, if an optical fiber with zero GVD were used, any signals and noise that are added at each optical amplifier would case the creation of light resulting from four-wave mixing, thereby increasing the possibility of restricting data transmission performance.

The result of this experiment shows that, using an apparatus according to the first embodiment, the data transmission distance was extended as far as about 6,000 km. This embodiment is thus advantageous over the conventional intensity modulation system, optical duobinary modulation system, and conventional polarization modulation system, because the conventional intensity modulation system only provided data transmission as far as about 3,000 km, while an optical duobinary modulation system and the conventional polarization modulation system each provided data transmission as far as about 5,000 km. In these conventional systems, the allowable transmission distance was restrained owing mainly to the SPM+GVD effect.

Second Embodiment

According to the first embodiment, the intensity-modulated component 51, which is not optically duobinary coded and thus exhibits less resistivity to dispersion. If this signal is also modulated as an optical duobinary signal so that a change in its waveform occurs gradually without chromatic dispersion, the transmission capability of the system against SPM+GVD effect is increased. Thus, according to the second embodiment, for increased resistivity against chromatic dispersion, this signal is subjected to phase modulation, which will be described below.

Figure 2:
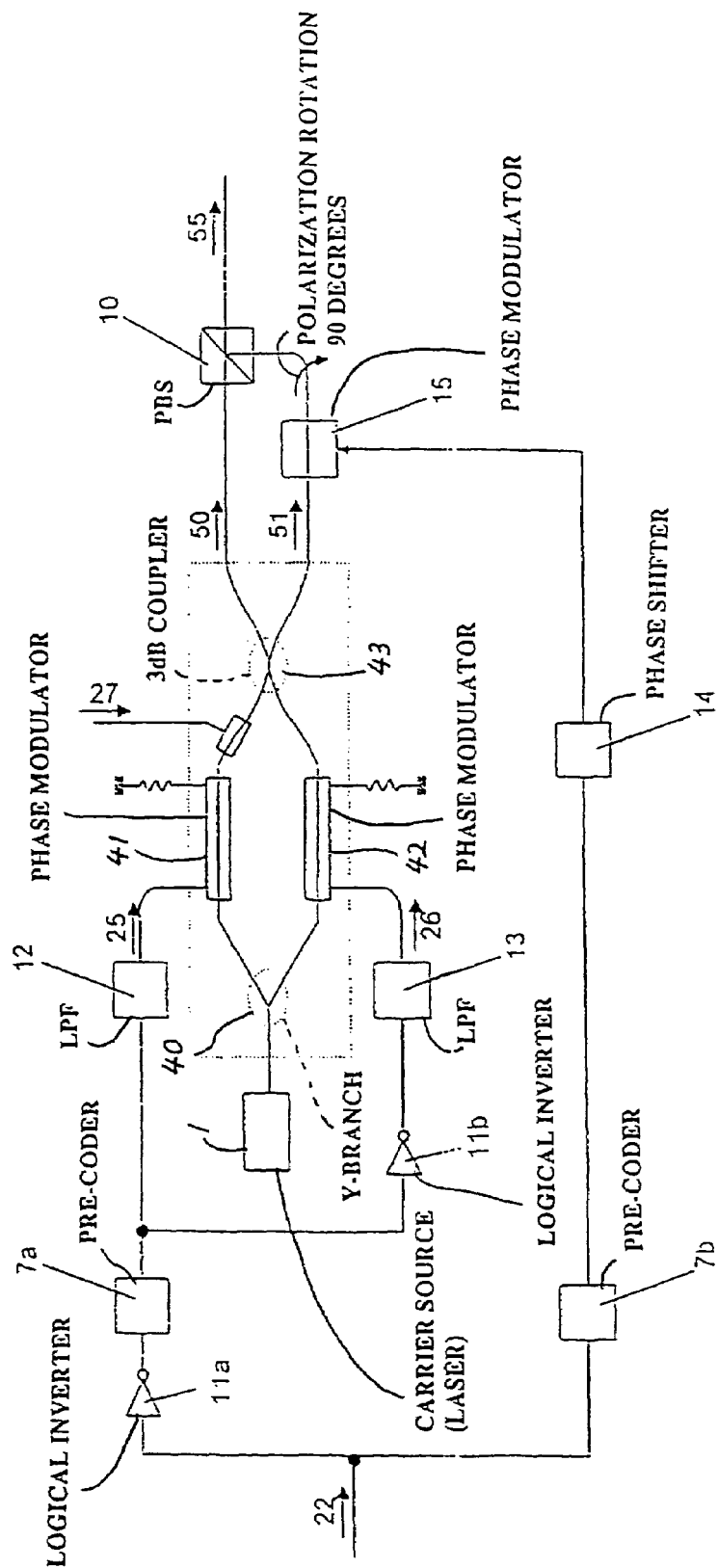
FIG. 2 is a schematic view of a second embodiment according to the present invention.

FIG. 2 illustrates the second embodiment. This embodiment is substantially the same as the first embodiment of FIG. 1 except the provision of a second pre-coder 7b, a phase shifter 14, and a phase modulator 15.

Input digital data signal 22 is divided into a first data signal and a second data signal.

The first data signal is fed to an optical transmitter for producing output lights 50 and 51. The optical transmitter used in this embodiment is substantially the same as its counterpart in the first embodiment. The output light 51 passes through the phase modulator 15 and is superimposed with the other output light 50 at a PBS 10. The setting of a DC bias adjuster 27 is such that square-law detection of the light 50 will provide a signal train having the same sign as that of the input data signal 22. In FIG. 2, the reference numeral 7a denotes a first pre-coder that corresponds to the pre-coder 7 of the first embodiment.

The second data signal is fed to the phase modulator 15 via the second pre-coder 7b and phase shifter 14. The second pre-coder 7b encodes the second data signal to feed the result to the phase shifter 14. The phase modulator 15 is driven by a signal from the phase shifter 14. The phase shifter 14 adjusts the driving signal such that a delay of 0.5 bit is provided to the timing with respect to the timing of intensity modulation of the light 51, and thus the phase is inverted at the center of a bit slot where the optical intensity is zero.

The second embodiment may be evaluated such that the intensity-modulated light 51 is encoded to optical duobinary coding employing an encoding technique using a serially connected intensity modulator and phase modulator, which is described in the afore-mentioned K. Fukuchi et al., OPC'97 Technical Digest, ThH3, 1997.

Third Embodiment

Figure 5:
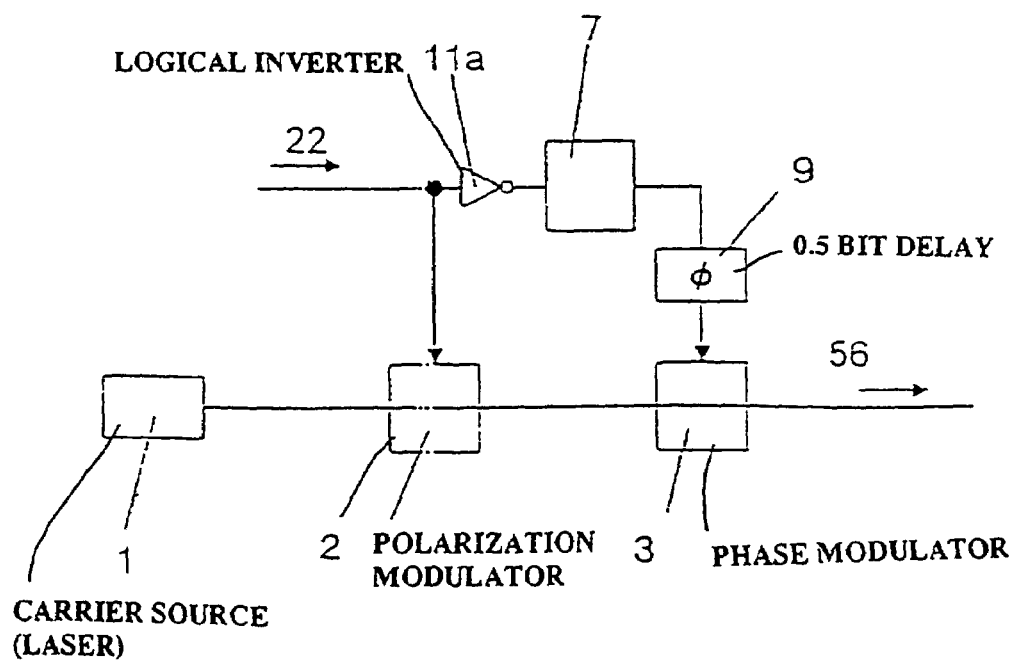
FIG. 5 is a schematic view of a third embodiment of the present invention.

FIG. 5 illustrates a portion of the third embodiment. The afore-mentioned publication K. Fukuchi et al., OFC '97 Technical Digest, ThH3, 1997 discloses an optical duobinary modulation system including a phase modulator and an intensity modulator which are connected in series. The third embodiment employs such an optical duobinary modulation system. The third embodiment results from replacing the intensity modulator with a polarization modulator. This system provides a modulated signal beam with an unaltered intensity. This configuration allows processing of a two-level digital signal instead of a three-level duobinary electric signal.

A semiconductor laser 1 produces radiation having a 1.55 µm wavelength band. With its linearly polarized state maintained, the laser beam propagates through a PM optical fiber to a LiNbO3 polarization modulator 2. The output of the modulator 2 is transmitted to a LiNbO3 phase modulator 3. The polarization modulator 2 outputs a mutually orthogonal polarized optical wave in response to two levels [1, 0], which a digital electrical signal input 22 assumes. The phase modulator 3 modulates the optical phase to [π, 0] (relative values) in response to the values [1, 0] of the input signal 22. The polarization modulator 2 launches the linearly polarized optical wave into the phase modulator 3 at an incident angle of 45 degrees.

The two-level data signal 22 is split into two, one being fed to the polarization modulator 2, the other being logically inverted at an inverter 11a and then encoded by a pre-coder 7. The encoded two-level data signal is delayed by 0.5 bit at a delay circuit 9 and then fed to the phase modulator 3. Considering the signal propagation delay time, this delay circuit 9 provides a delay of 0.5 bit to the timing of the phase modulation with respect to the timing of the polarization modulation so that the phase is inverted at the center of a bit slot of the polarization modulation. The configuration provides a modulated signal (output light) 56 having an unaltered intensity. As described above, according to this third embodiment, the light issued by a source of light is subjected to polarization modulation and then to phase modulation in this order. With regard to the order of processing, the light may be subjected first to phase modulation and then to polarization modulation. If the timing of the driving signal is appropriately adjusted, this modified configuration provides substantially the same result. With regard to the position of delay circuit 9, its position relative to the inverter 11a and pre-coder 7 is not limited to the illustrated example.

As suggested in the above-mentioned K. Fukuchi et al., this configuration assures improved performance if the polarization modulation is appropriately tuned. According to this embodiment, a DC bias voltage applied to polarization modulator 2 is tuned to shift the operating point of the modulator in such a direction as to increase the optical intensity at the cross points of an eye pattern, which is provided after separation at the PBS. Such a shift in bias ranging from 0.1 V$\pi$ to 0.2 V$\pi$ has proved to be effective.

Using this configuration of the third embodiment, the optical fiber transmission experiment was conducted under the same conditions as the experiment conducted with the configuration of the first embodiment. The result of the experiment shows that the data transmission distance was extended as far as about 7,000 km.

Figure 6:
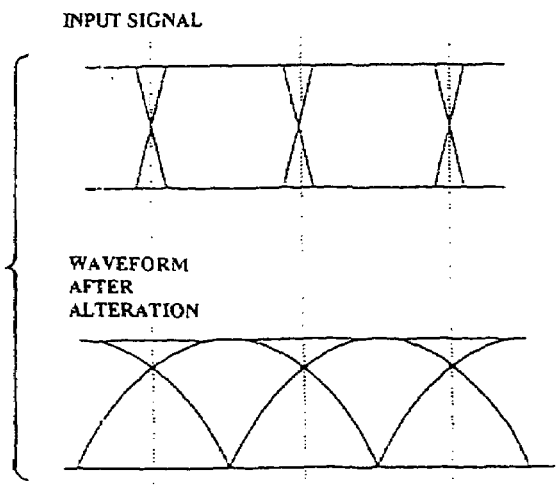
FIG. 6 illustrates waveforms.

According to the third embodiment, the bias point of the polarization modulator 2 is shifted to modulate the wave shape upon polarization modulation. Substantially the same result may be obtained by modulating the wave shape of a driving signal applied to the modulator as shown in FIG. 6. Operating an amplifier under gain saturated conditions or utilizing a non-linear transmission characteristic of a diode, for example, are other effective measures to provide substantially the same result. If the diode characteristic is used, the cross points of the eye pattern shift downward (towards the low intensity side). In this case, an inverter amplifier may be used to invert the polarity.

Fourth Embodiment

Figure 7:
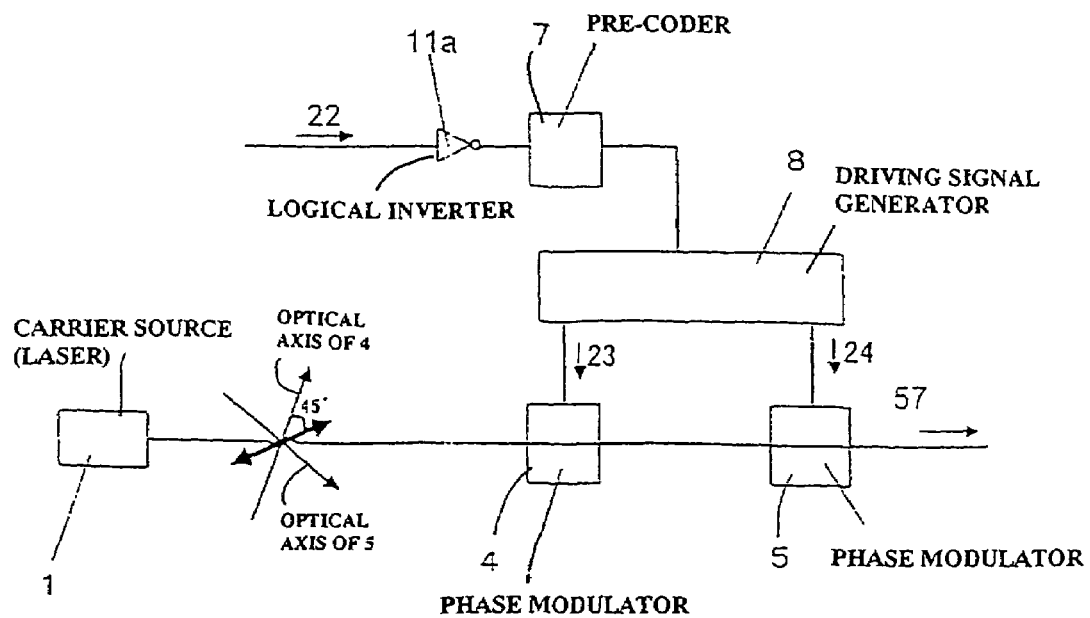
FIG. 7 is a schematic view of a fourth embodiment of the present invention.

Referring to FIG. 7, the fourth embodiment will now be described. A semiconductor laser 1 produces radiation having a 1.55 μm wavelength band. With its linearly polarized state maintained, the laser beam propagates through a PM optical fiber to a first phase modulator 4. The light output of the modulator 4 is fed to a second phase modulator 5. Each of the modulators 4 and 5 allows incident linearly polarized wave light to fall thereon obliquely at 45 degrees with respect to an optical axis thereof, resulting in the performance of polarization modulation. The term "optical axis" is herein used to mean the direction of the polarization plane that is subjected to phase modulation within an electric field. The optical axes of the first and second phase modulator 4 and 5 cross each other at right angles.

Figure 8:
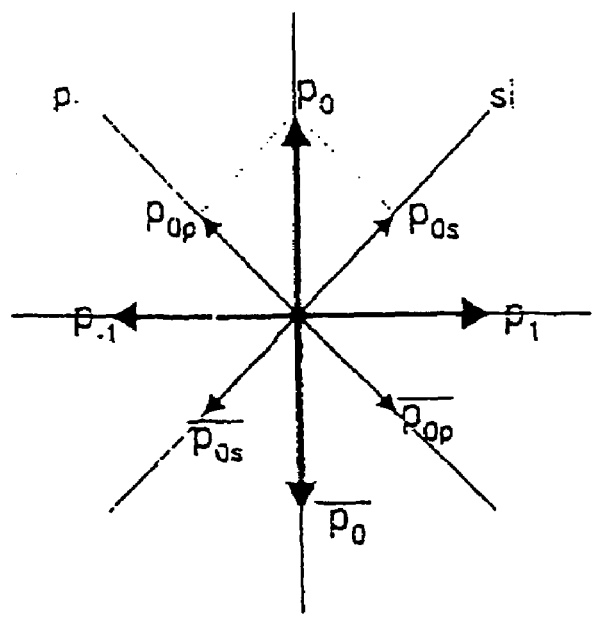
FIG. 8 illustrates polarization modulation in the fourth embodiment.

Referring to FIG. 8, the operation of each of the phase modulators 4 and 5 will now be explained. Suppose that the optical axis of the first phase modulator 4 is p, and the optical axis of the second phase modulator 5 is s. When driving signals 23 and 24 to these modulators 4 and 5 are zero, i.e., phase modulation is not requested, a vector $P_0$ represents the polarized state of the output beam. Let us consider the case when the driving signals 23 and 24 drive the phase modulators 4 and 5. The vector $P_0$ may be resolved into a p-axis vector component $P_0p$ and a s-axis vector component $P_0s$. These vector components are subjected to phase modulations by the phase modulators 4 and 5, respectively. In other words, they are subjected to a phase difference $\pi$. The phase modulated vector components are combined into a resultant vector. Suppose the first phase modulator 4 only is switched on ($O_p=1$). The direction of the vector component $P_0p$ is inverted into an inverted vector component $\overline{P_0p}$ over-bar. The vector components $P_0p$ over-bar and $P_0s$ make a resultant vector $P_1$. The polarized wave represented by this resultant vector $P_1$ is orthogonal to the polarized wave represented by the vector $P_0$. Suppose now that the second phase modulator 5 only is switched on ($O_s=1$), the direction of the vector component $P_0s$ is inverted into an inverted vector component $P_0s$ over-bar. The vector components $P_0s$ over-bar and $P_0p$ make a resultant vector $P_1$. The polarized wave represented by this resultant vector $P_{-1}$ is orthogonal to the polarized wave represented by the vector $P_0$. The vectors $P_1$ and $P_{-1}$ represent the same polarized wave but inverted phases.

Similarly to the process of obtaining a two-level encoded signal in the first embodiment, digital data signal 22 is impressed on an input of a logical inverter (NOT circuit) 11a. A pre-coder 7 codes the output of the inverter 11a to provide a two-level digital signal. This two-level signal is fed to a driving signal generator 8.

The driving signal generator 8 converts a current signal ($b_i$) of the two-level signal and the one bit preceding signal ($b_{i-1}$) thereof by a code conversion rule represented by a truth value table under the heading TABLE II into the driving signals $O_p$ (23) and $O_s$ (24).

Figure 9:
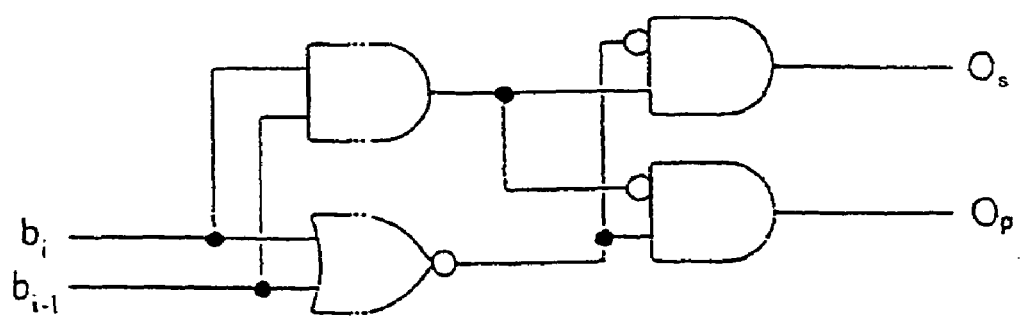
FIG. 9 is a circuit diagram illustrating one example of a driving signal generator.
Figure 10:
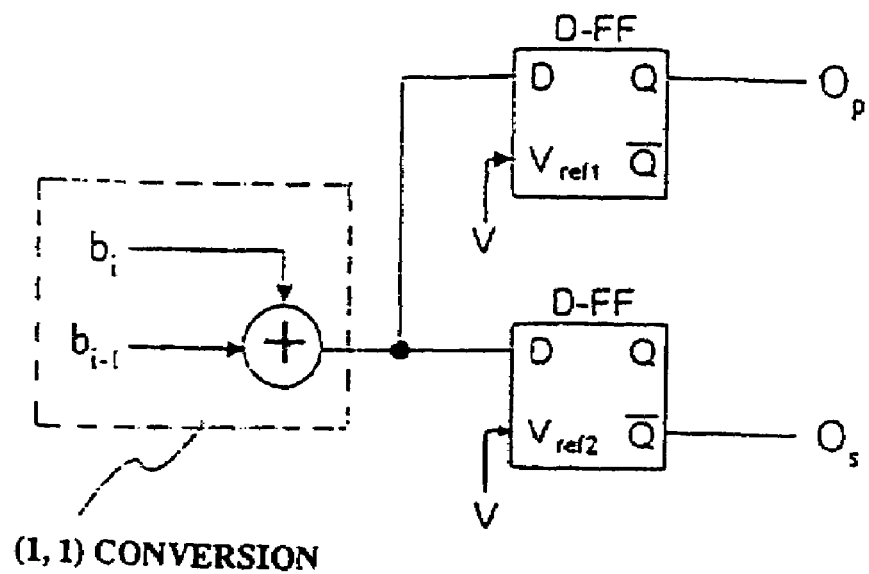
FIG. 10 is a circuit diagram illustrating another example of a driving signal generator.
Figure 11:
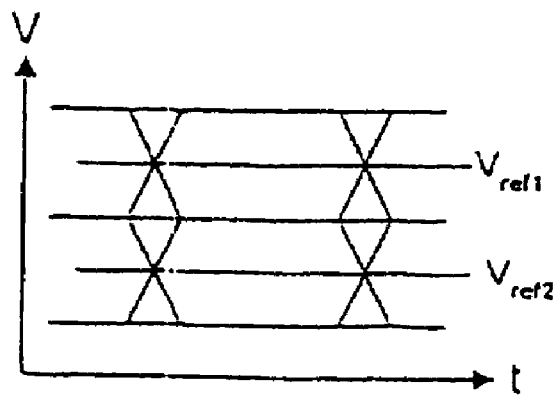
FIG. 11 illustrates two reference levels.

If a signal level of zero (0) continues over two bits, the first phase modulator 4 is switched on ($O_p=1$). If a signal level of one (1) continues over two bits, the second phase modulator 5 is switched on ($O_s=1$). If the same level fails to continue over two bits, both the first and second phase modulators 4 and 5 are switched off ($O_p=O_s=0$). FIGS. 9 and 10 show circuits implementing this Boolean operation. In the circuit arrangement of FIG. 10, a three-level signal obtained after an initial stage (1, 1) conversion is fed, as input, to first and second discriminators (D-FF). The first discriminator (D-FF) produces a high level signal of two-level output $O_p$ if and only if the input signal exceeds a first discrimination level $V_{ref1}$ (see FIG. 11). The second discriminator (D-FF) produces a high level signal of a two-level output $O_s$ if and only if the input signal exceeds a second discrimination level $V_{ref2}$ (see FIG. 11) that is lower than the first discrimination level $V_{ref1}$.

Referring to the truth value table 2, if $b_i$ has a mark ratio of ½, $O_s$ and $O_p$ have the dropped mark ratio of ¼, respectively. This is disadvantageous in that the drivers are required to posses superior low frequency cut-off characteristics. To cope with this, if $b_{i-1}=0$ or if $b_{i-1}=1$ and $b_i=0$, both $O_s$ and $O_p$ are allowed to take on a level of 1. Thus, both $O_s$ and $O_p$ have a mark ratio of ½, providing a good DC balance, and allowing the use of ordinary drivers. In this case, truth-value tables under the headings TABLE III and TABLE IV are used. In phase modulation with a phase difference of $\pi$, inverting the polarity of the driving signals provides the same result, thus allowing modulation with the relationship $O_p=b_i$ and $O_s=b_{i-1}$ or the relationship $O_s=b_i$ and $O_p=b_{i-1}$, being maintained. Very simple circuits can be used to implement this modulation. If $O_s=O_p=1$, the output polarized wave becomes the phase inverted version of $P_0$ and thus may be represented by $P_0$ over-bar. At the receiving end, $P_0$ and $P_0$ over-bar are recognized as the same. Thus, the original codes are restored without any problem. With the preceding configuration according to the fourth embodiment, the modulated signal 57 with unaltered intensity can be obtained at all times.

Using the configuration of the fourth embodiment, the optical fiber transmission experiment was conducted under the same conditions as the experiment conducted with the configuration of the first embodiment. The result of the experiment shows that the data transmission distance was extended as far as about 8,000 km.

Figure 12:
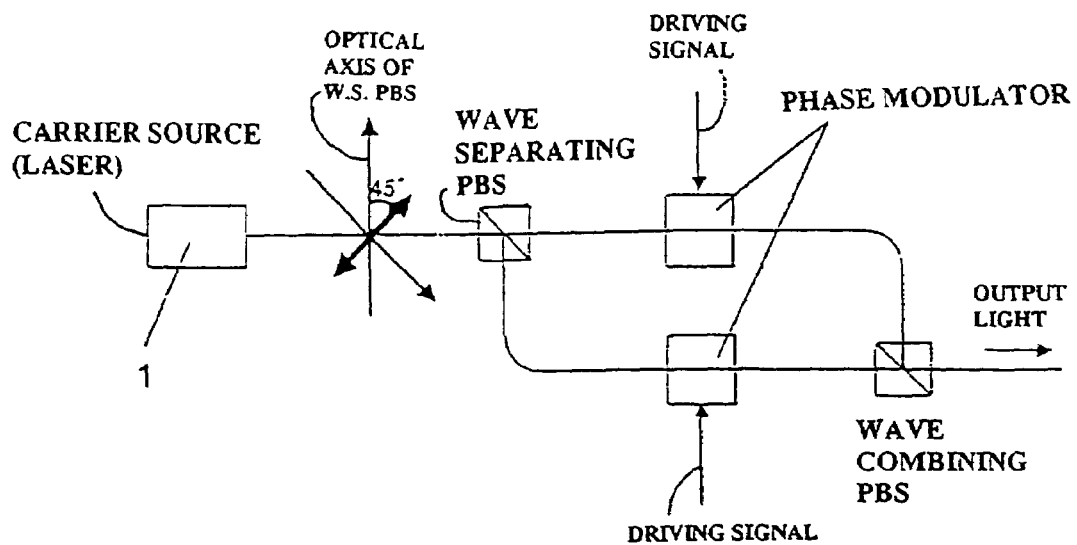
FIG. 12 is a schematic view of a fifth embodiment of the present application.
Figure 13:
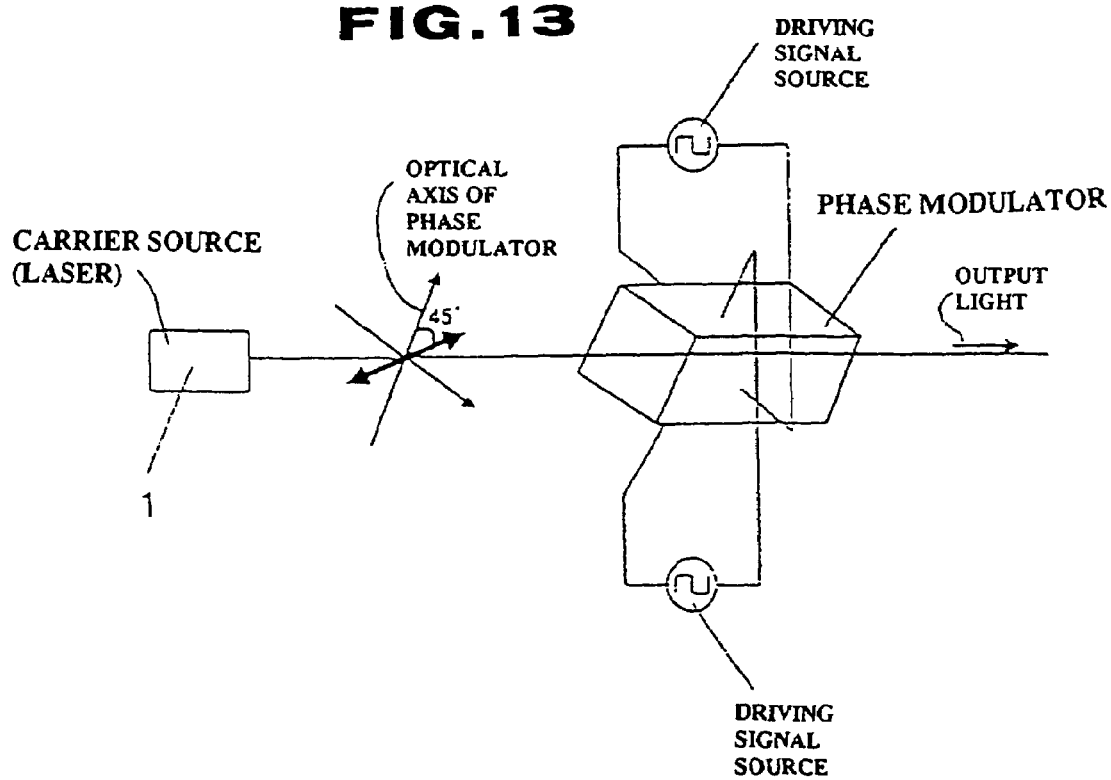
FIG. 13 is a schematic view of a sixth embodiment of the present invention.

Referring to FIGS. 12 and 13, the fifth and sixth embodiment, which are similar to the fourth embodiment will be explained below.

Fifth Embodiment

In FIG. 12, light from the source of light is divided by a wave separating polarization beam splitter (PBS) into two polarized halves, each of which is subjected to phase modulation, and superimposed on each other at a wave combining polarization beam splitter (PBS). In the third embodiment, the orthogonally polarized waves propagate through the same space. In this configuration, they propagate through different spaces, respectively. This configuration requests maintenance of an optical path length between the two PBSs of the wavelength order. Thus, integration cannot be avoided for implementation of this configuration.

Sixth Embodiment

In FIG. 13, an optical modulator utilizing the Pockels effect is used. This modulator includes a crystal that exhibits the Pockels effect, and has electrodes to allow an orthogonal application of two independent electric fields used to modulate a laser beam. According to this configuration, the Pockels modulator performs the same function as the modulators in the third embodiment. In this case, modification of the phase modulator to the travelling wave type has proved to be difficult. Thus, it has to be of the lumped-constant type, and a satisfactory operation speed cannot be expected. The same manner of converting data input into driving signals as used in the third embodiment may be used in each of these embodiments.

With regard to a driving signal generator for driving the two phase modulators associated with the first and second polarized waves of the carrier light, the signal processing time is reduced, the manufacturing cost is decreased, and the reliability is increased by taking the following measures. Firstly, an input data signal is divided into a first data signal and a second data signal. Secondly, the second data signal is delayed by one bit. Thirdly, the first polarized wave of the carrier light is phase shifted by an angle of $\pi$ in response to the first data signal, while the second polarized wave of the carrier light is phase shifted by an angle of $\pi$ in response to the delayed second data signal.

Seventh Embodiment

Figure 14:
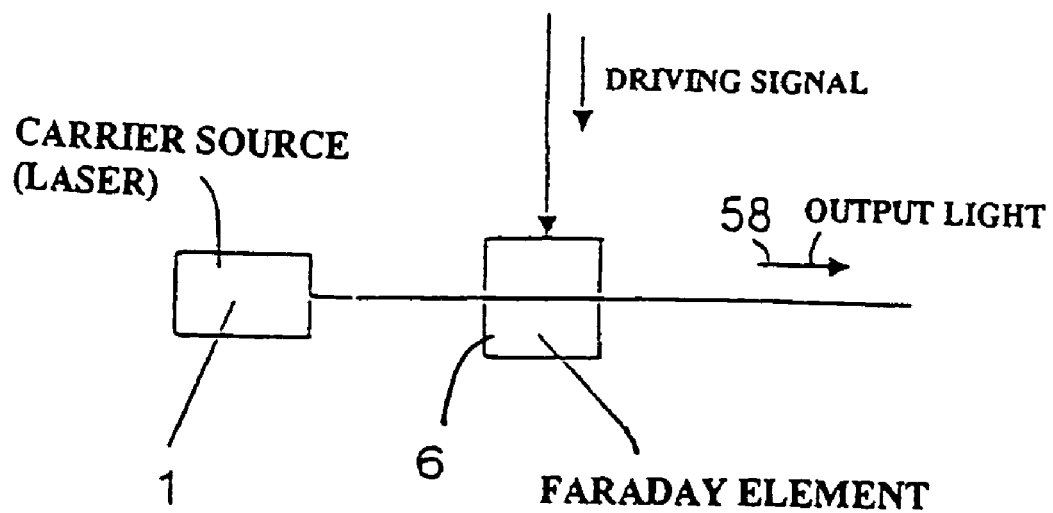
FIG. 14 is a schematic view of a seventh embodiment of the present invention.

FIG. 14 illustrates the seventh embodiment. This embodiment employs an optical rotator, which induces optical rotation, as a modulator for modulating a polarized wave. The Faraday effect is used in this embodiment to modulate the angle of optical rotation in response to an inputted electrical signal. The term "Faraday element" is herein defined to mean a modulation element utilizing the Faraday effect.

The output optical beam of a laser light source 1 propagates through a PM optical fiber to a Faraday element 6. With the Faraday element 6, three levels of duobinary signals are allocated to three values $\delta=0$, $\delta=\pi/2$, and $\delta=\pi$ of the optical rotation angle, respectively. It must be noted that $\delta=0$, and $\delta=\pi$ define the same polarization state of the carrier light with inverted phases relative to the output beam of the laser light source 1, and $\delta=0$ and $\delta=\pi/2$ define orthogonally polarized waves.

With this configuration, a modulated output light 58 with an unaltered or constant intensity has been obtained, which exhibits signal spectrum similar to that of optical duobinary signal.

Using this configuration of this embodiment shown in FIG. 14, the optical fiber transmission experiment was conducted under the same conditions as the experiment conducted with the configuration of the first embodiment. The result of the experiment shows that the data transmission distance was extended as far as about 7,000 km.

In the embodiments thus far described, a LiNbO3 modulator or a Faraday element is used as a phase modulator and a polarization modulator. Any electrical, mechanical, or optical types of devices may be used instead as long as they can modulate phase or polarization at a rate around signal speed. With regard to the material, such devices may be made of semiconductor or organic material or non-organic material or optical fiber. As the phase modulator, a push-pull drive MZ type light intensity modulator may be used.

In the preceding description, various circuit examples of a pre-coder have been illustrated. The structure of the pre-coder is not limited to these examples. Appropriate combinations of logic circuits or analog circuits may be employed to perform the expected function.

In the preceding embodiments, in translating three levels of duobinary signal to +1, P, −1 of carrier light, a phase of polarization that is orthogonal to P is inverted immediately before or after an appearance of P. If P continues, the carrier light with the orthogonal polarization is not used as an output. Thus, in this case, the phase inversion is not needed.

What is claimed:

1. An optical data transmitting apparatus comprising:
   a carrier light source;
   means for separating a binary input data signal into a first data signal and a second data signal;
   a polarization modulator that polarizes said carrier light source in response to said first data signal to obtain a polarization modulated light;
   a pre-coder that encodes said second data signal to output a coded second data signal; and
   a phase modulator that phase shifts said polarization modulated light in response to said coded second data signal.

2. The optical transmitting apparatus of claim 1, wherein said pre-coder outputs the coded second data signal at a logic level of a previous bit interval if said second data signal has a one level, and the coded second data signal switches logic level from the previous bit interval if said second data signal has zero level, and wherein said phase modulator delays modulation of said polarization modulated light by a 0.5 bit interval from polarization of said carrier light by said polarization modulator.

3. An optical transmitting apparatus as claimed in claim 1, including a waveform modifying means for modifying said first data signal prior to application to said polarization modulator, said waveform modifying means outputting a binary data signal exhibiting an eye pattern having cross points increased above a center of intensity.

4. An optical transmitting apparatus as claimed in claim 3, wherein said waveform modifying means is an amplifier, and wherein said amplifier is in a gain saturated condition when a maximum amplitude of said first data signal is applied to said amplifier.

5. An optical transmitting apparatus as claimed in claim 3, wherein said waveform modifying means is a diode and an inverter.

6. An optical transmitting apparatus as claimed in claim 1, wherein a bias voltage applied to said polarization modulator is adjusted to raise cross points of an eye pattern of an optical waveform of said polarized modulated light above a center of intensity.

7. An optical data transmitting method comprising the steps of:
  separating a binary input data signal into first data signal and second data signal;
  polarization modulating a carrier light in response to said first data signal to obtain a polarization modulated light;
  transforming said second data signal into a code transformed second data signal; and
  phase modulating said polarization modulated light in response to said code transformed second signal.

* * * * *